US005649605A

United States Patent [19]

Rønne et al.

[11] Patent Number: 5,649,605

[45] Date of Patent: Jul. 22, 1997

[54] WHEELED CHASSIS AND STEERING DEVICE FOR STEERING IT

[75] Inventors: Gert Steen Rønne, Kokkedal; Mogens Ilsted Bech, Birkerød, both of Denmark

[73] Assignee: Gemo 1991 ApS, Horsholm, Denmark

[21] Appl. No.: 320,314

[22] Filed: Oct. 11, 1994

Related U.S. Application Data

[63] Continuation-in-part of PCT/DK93/00129, Apr. 7, 1993.

[30] Foreign Application Priority Data

Apr. 10, 1992 [DK] Denmark .................................. 0483/92

[51] Int. Cl.[6] ...................................................... B62D 61/10

[52] U.S. Cl. ............................ 180/23; 180/234; 180/241; 180/251

[58] Field of Search ...................................... 180/907, 234, 180/241, 251, 23

[56] References Cited

U.S. PATENT DOCUMENTS

| | | | |
|---|---|---|---|
| 4,274,503 | 6/1981 | Mackintosh | 180/236 |
| 4,533,998 | 8/1985 | Falamak | 364/424 |
| 4,683,973 | 8/1987 | Honjo et al. | 180/252 |
| 5,174,593 | 12/1992 | Chapman | 180/234 |

FOREIGN PATENT DOCUMENTS

| | | | |
|---|---|---|---|
| 26098 | 4/1981 | European Pat. Off. . | |
| 62-128833 | 6/1987 | Japan | 180/234 |
| 2184988 | 7/1987 | United Kingdom . | |
| WO91/18577 | 12/1991 | WIPO . | |

*Primary Examiner*—Eric D. Culbreth
*Attorney, Agent, or Firm*—Antonelli, Terry, Stout & Kraus, LLP

[57] ABSTRACT

A chassis, particularly for carrying a wheelchair with pivotal seat (S), fitted with ground-engaging wheels with at least one driven from a drive device through a drive transmission and with at least one steerably suspended and connected to a steering motor receiving steering signals for steering the chassis bearing while driving from a steering panel comprising steering control devices (STY) is described, whereby all steerably wheels (2R) are drive device driven and steerably suspended each being pivotal about a vertical steering axis (2S, STF) geometrically maintained within or at a vertical plane comprising the wheel axis (2RAKS). By means of a between the steering axes (2S) arranged and these mechanically connecting steering transmission system (STT) including a herethrough for the pivoting of said steering axes (2S, STF) connected steering driving device rotating the axes, and through the same direction of rotation, each steering axis (2S, STF) is arranged able to pivot all said wheels about their steering axes (2S, STAKS, STF), i.e. through mainly equally sized pivoting angles independently of the bearing of the seat or dependently being correlated therewith. A drive device can directly or through a drive transmission system (RTT, RTAKS) with the same direction of rotation simultaneously rotate all wheels (2R). A steering system hereto, mainly of electronic kind, is described.

6 Claims, 9 Drawing Sheets

Fig. 1
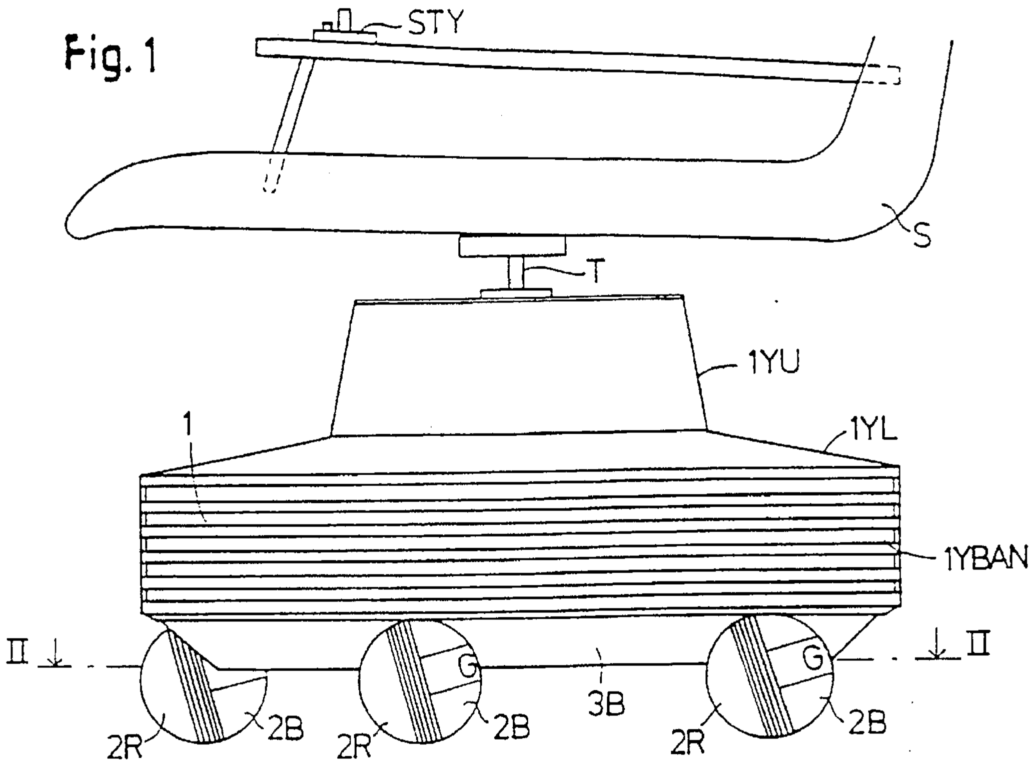
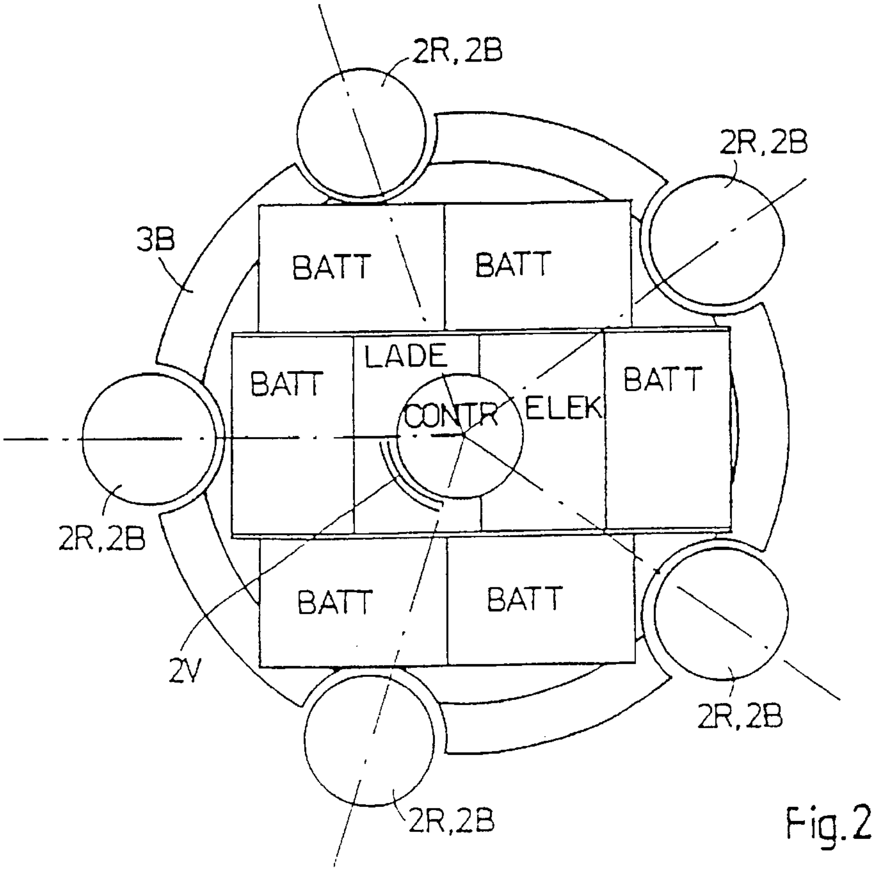
Fig. 2

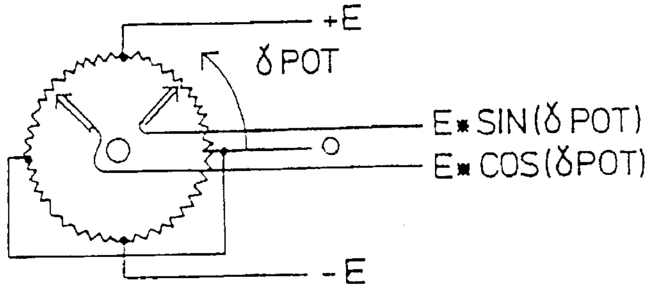
Fig.8
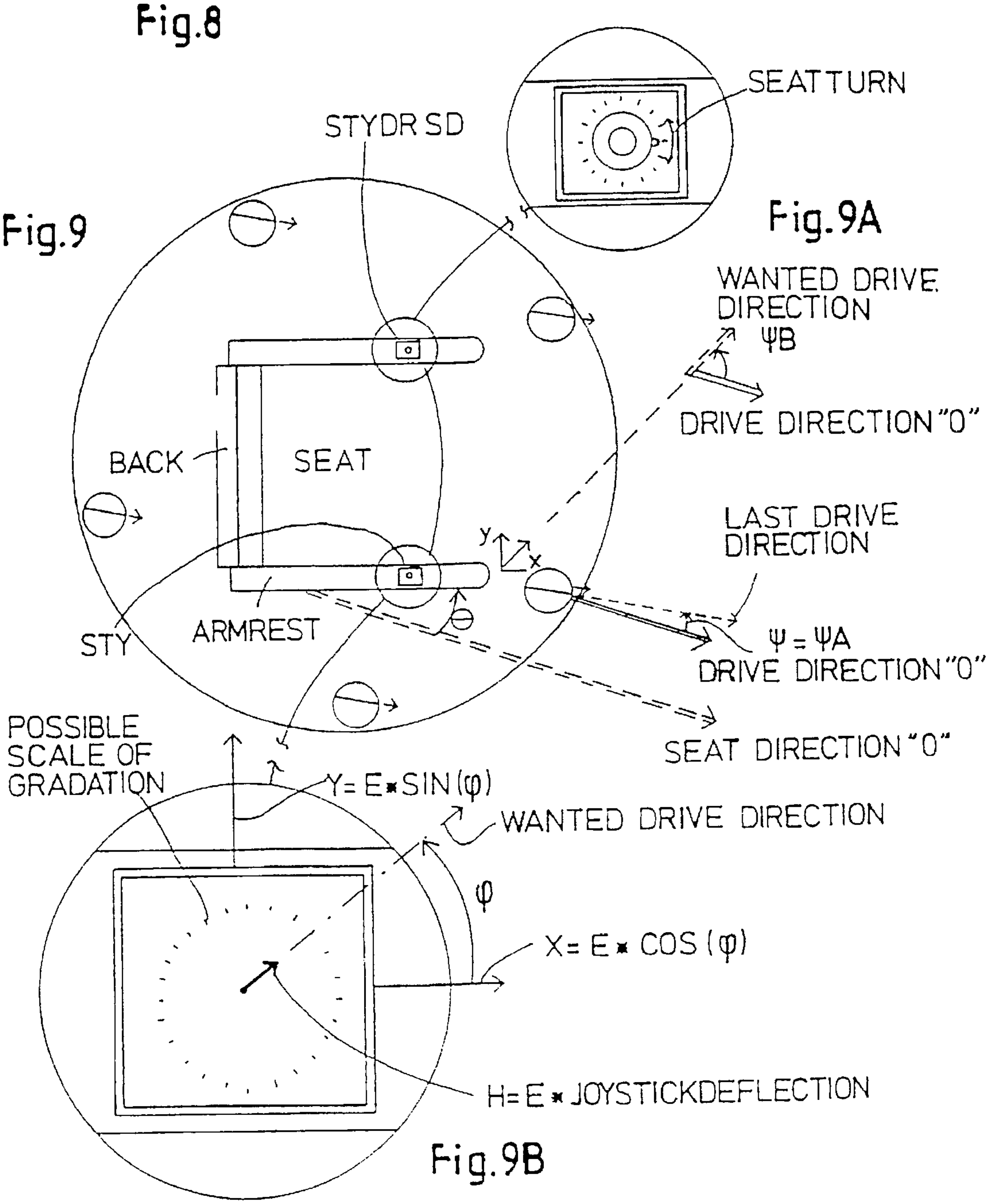
Fig.9
Fig.9A
Fig.9B

WHEELED CHASSIS AND STEERING DEVICE FOR STEERING IT

TECHNICAL FIELD

This application is a continuation in part of International Application No. PCT/DK93/00129 with a international filing date of Apr. 7, 1993, and which designated the United States.

The present invention relates to a wheeled chassis including a drive device for driving wheels, and which wheeled chassis may serve as chassis for a wheelchair or as a wheeled chassis for the transporting of some other object, the wheeled chassis having at least one of the wheels driven by the drive device through an intermediary drive transmission, and whereby at least one of the wheels for the steering of the driving course of the chassis is mounted to the chassis through a steerable support being steerable by means of at least one, to the steerable support connected, steering motor which steering motor receives steering signals from a steering panel with steering control devices, and whereby the wheeled chassis further comprises support means adapted to support a chair or other holding means adapted for the fixation and holding of the objects to be transported.

BACKGROUND ART

Generally, most wheelchairs of prior art technique, which are employed for transporting of invalid persons or of weaker or ill persons being unable to walk themselves, are made in conformity with the above described technique of prior art, i.e. they comprise a chassis, generally a frame shaped chassis, which through suitably suspended wheels, the suspension means thereby comprising suitable spring means and being of per se known kind, carries four ground-engaging wheels of suitable size, of which wheels two may be fitted to the chassis with one on each of two opposite sides of the chassis, the wheels being carried through a common in cross direction arranged wheel axle or through two separate wheel axles, which are arranged sharing a common geometric axis, and whereby the further two of the ground-engaging wheels are steerably suspended in that their steering axes are vertically oriented, and in that in general two of the ground-engaging wheels are connected to a wheel drive means and are made steerable as described above as from a steering control panel situated as suitable within easy reach of the person being transported by the wheel chair.

With such an arrangement of the ground-engaging wheels, in general they are arranged as in case of a common rear-wheel-driven automobile, though the suspension structures for the wheels do have a more simple structural shape, because they only are going to be operated at fairly low drive speeds. On the other hand, the steering wheels are suspended in such a manner so that geometrically the vertical steering axis is located in front of the wheel axles whereby in per se well known manner a self correcting straight forward driving can be maintained.

This usually employed kind of structure for a wheelchair suffers under more than one drawback. Such a wheelchair can not be described as being particularly steerable, and in case of more complicated steering such as for steering to achieve a close passing of larger objects, furniture, etc., in narrow environments require the use of reverse to bring the rear wheels to follow a correct track. A sideward directed driving of the wheel chair is not attainable in a fairly easy manner except to bring about more small to and from movements by the wheelchair, and thus only a kind of sideward zig-zag-driving may be the only sideward movement which in a somewhat awkward manner may be attainable.

Moreover, an oblique direction of approach while driving close to a table is only possible, whenever to and from driving are not wanted to be carried out, in the manner that the wheelchair, including the seat of it, are brought to attain an oblique oriented position as in relation to the edge of the table. It is thus easily understood that a person being seated in the chair also simultaneously in position has to be turned similarly oblique in relation to this same edge of the table. When a person being seated in the chair thus has to be brought to bed or has to be brought into the seat from a bed this is only possible when the front of the wheelchair is oriented so that it is turned straight forward towards to oblique towards the side or longitudinal edge of the bed, in such a situation substantial additional labor is required from an aiding person, as well when a person has to be passed from the wheelchair to the bed as when the person has to be moved in the opposite direction.

DISCLOSURE OF THE INVENTION

The present invention it is the purpose to provides a wheeled chassis and an arrangement of the ground-engaging wheels for a wheelchair of the above mentioned kind, whereby the required drive means and steering means both are of a fairly simple structure, and whereby the mentioned well known drawbacks are avoided, i.e. to a first approximation that the wheelchair is made able to move sidewards omnidirectionally, i.e. in any direction running oblique to a presently existing direction of movement.

This is according to the present invention by a wheeled chassis of the above mentioned kind with all steerable wheels are driven ground-engaging wheels, whereby the drive ground-engaging wheels are mounted steerably suspended with each of them being pivotal about a vertical steering axis geometrically maintained within or in the near vicinity of a vertical plane comprising the respective wheel axis, and in that between the steering axes is a mechanically connecting steering transmission system including, through the steering transmission system, pivoting of the steering axes is a steering driving device simultaneously and through the same direction of rotation each steering axis is arranged able to pivot all the driven ground-engaging wheels about their steering axes, i.e. through approximately mainly equally sized pivoting angles, and that with the driven ground-engaging wheels directly connected, or through a drive transmission system is connected, a drive device simultaneously through equal units of time in the same direction of rotation rotates all the driven ground-engaging wheels with mainly equally sized angles of rotation about their wheel axes.

Herethrough, by means of a wheelchair according to the invention the aforementioned purposes are attained, and further advantages are achievable as to be described as follows.

By means of the invention all suspensions for the ground-engaging wheels may be shaped alike, and a compact structure of the chassis is provided, and furthermore, the wheeled chassis itself may be a rotational symmetrical structure comprising mainly equally shaped structural segments within such a rotational symmetrical structure.

The ground-engaging wheels, in particular according to the invention, are arranged equally spaced along the periphery of a horizontally circularly shaped or regularly shaped wheeled chassis.

In accordance with this purpose in particular suitable ground-engaging wheel arrangement by which the individual wheels only occupy a small space is according to the invention characterized in that the steering axis comprises two coaxially arranged axes or shafts of which the coaxially innermost at the lower end and terminates in a gear, in particular a conically shaped gear of a bevel gear type engaging a corresponding conical gear with engaging teeth provided a ground-engaging wheel whereby the wheel axis hereof geometrically together with the ground form an angle of a size deviating from zero degrees and preferably is between 10 and 30 degrees, whereby the steering axis intersects the ground-engaging point of the wheel and whereby the wheel axis is bearing suspended in a bearing block in a fixed manner connected with the coaxially outermost of the steering axes, and the upper end of the two coaxially steering axes or shafts respectively are connected with the drive transmission system and with the steering transmission system which respectively provide drive connections with on the one hand the driving drive device and on the other hand the steering drive device, and whereby each individual ground-engaging wheel and each individual bearing block preferably both can be semi-spherically shaped and arranged with their flat surfaces facing each other, and whereby between them for keeping-away dust and/or dirt an annular sealing means is provided inserted between the two semi-spherically shaped bodies.

The ground-engaging wheels may in per se known manner be provided with a sufficiently safe non-sliding tread which can be of hard rubber.

To safeguard that the individual ground-engaging wheels in case of driving on uneven ground exerts somewhat the same wheel pressure against the ground, the steering axes of the ground-engaging wheels can according to the invention all be arranged suspended in an elastomeric, in particular a spring like elastomeric, plate member and of such kind which interconnect the bearings for the steering axes.

By means of such a bearing arrangement the individual steering axis or shaft during movements has a spring effect which to a large extent provide parallel orientation.

To achieve that the center of gravity of the structure is low in the structure and that an easy access is provided to batteries, electric devices, namely such as a charging device for batteries, as well as electric and electronic equipment, namely such as electronic steering panels, contractors and other switching members, it is according to the invention preferred that such members are arranged as being mounted on a plate shaped bottom element which has a diameter being of approximately the same size as the diameter, or a little less than between opposite positioned ground-engaging wheels mounted on the wheeled chassis, and that the bottom plate element in a radial direction at the periphery is arranged to have a slant upwards running peripheral rim, and that the bottom plate element is easy-to-fasten by means of easy accessible holding members of per se known kind, such as screws, snaplock-devices, locking mechanisms, etc., is kept in place on the wheeled chassis.

To avoid any producing of scratching of foreign objects while driving the wheelchair the upper portion of the wheeled chassis may be covered by means of at least one single element shaped as a broad annular top cover having a peripheral portion which is cylindrically shaped and downwardly terminates in a skirt shaped portion having an external surface thereof arranged as or being comprised of a broad belt or girdle exhibiting suitable elastomeric properties against impact from external objects, being of a material such as soft rubber or any other kind of elastomeric plastic material, and whereby the top cover by means of suitable fastener or holding means of any per se known kind, such as screws, snap-locking mechanisms, locking mechanisms, etc., in an easy-to-dismantle manner is kept in position on the wheeled chassis.

According to the invention it is advantageous to arrange preferably at least two simple, rigid and radially oriented connecting struts which provide a mechanically rigid connection between a central supporting member, which serves to support a wheelchair seat or serves to support any other object to be transported by means of the wheeled chassis, and at least one of the aforementioned peripheral elastomeric plate elements which belong to the wheeled chassis, and whereby the connecting struts comprise fastening means or fastening apertures for the fastening of at least one, preferably for the fastening of two vertically spaced arranged, device-supporting plate member(s) arranged to support the driving and steering drive means, and whereby preferably between these two drive means drive and steering transmissions are arranged, thus connecting the driving and steering drive devices and the suspension for the ground-engaging wheels.

Suitable transmission elements may be provided each in common for all suspensions of the ground-engaging wheels arranged between the suspensions running a toothed belt or chain element, which also has to be connected with the respective drive and steering drive device, and which devices for the two operational functions to be carried out preferably are arranged to be common for all the ground-engaging wheels, and thus including at least one per se known tightening element for the tightholding of these elements.

BRIEF DESCRIPTION OF THE DRAWINGS

Embodiments according to the invention are described in further details as follows under reference to the drawing in which:

FIG. 1 shows seen from the outside in sideview an embodiment according to the invention of a wheeled chassis, FIG. 2 shows cross section II—II according to FIG. 1, FIG. 8 shows in general of a well known embodiment of an angle encoder for outputting sine and cosine values of the angle, FIG. 9 shows schematically according to the invention a wheeled chassis fitted with a seat and with steering control panels arranged on the armrest, FIGS. 9A and 9B show in more detail as seen from the top the two steering panels shown in FIG. 9.

Figure 3:
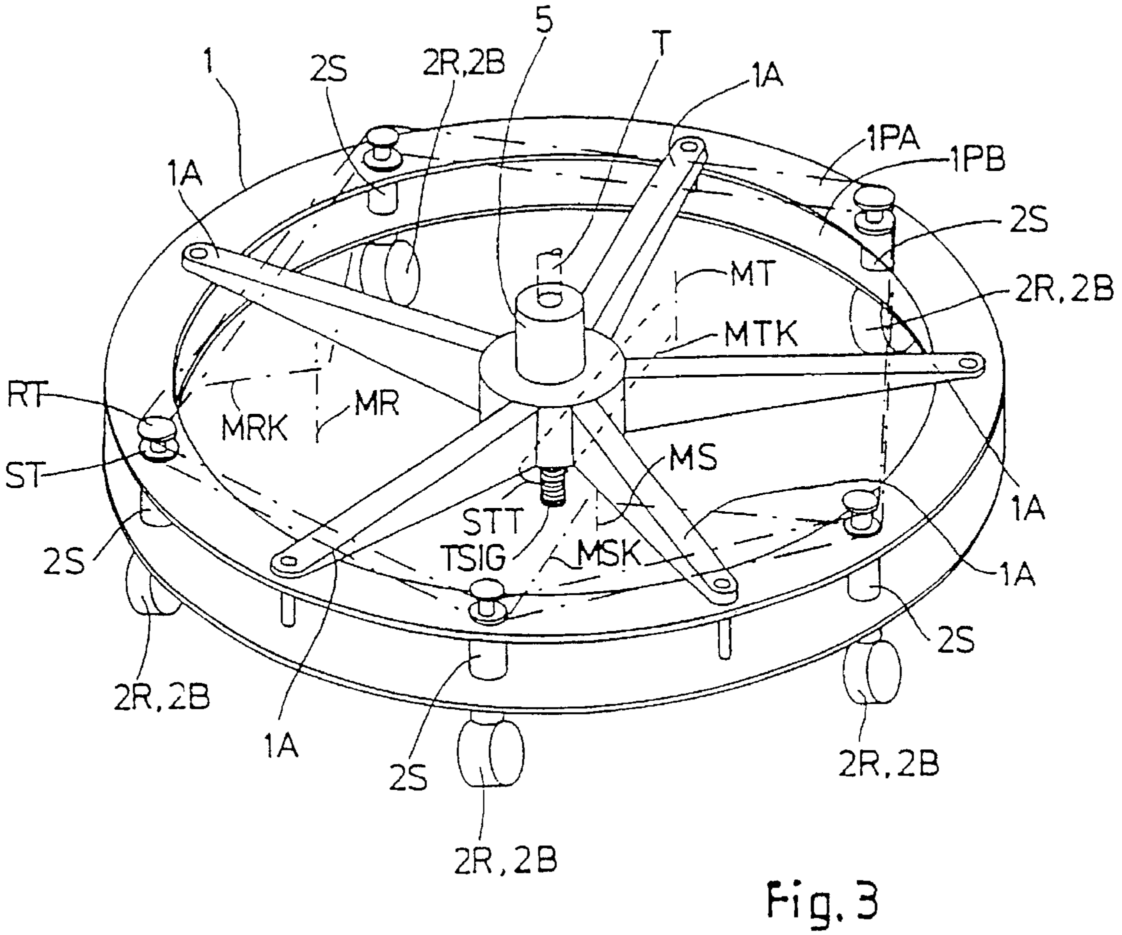
FIG. 3 shows in perspective the supporting portion of an embodiment of a wheeled chassis according to the invention whereby all exterior cover plates and the bottom plate including carried drive devices as shown in FIG. 2 cut away.

Within the drawing elements or elements serving the same functional purpose are marked with the same sign of reference. When two elements are either closely related or, as viewed, are positioned being each other their reference identification numerals are shown separated by a comma, and the written sequence is correlated with their viewing distances.

BEST MODE FOR CARRYING OUT THE INVENTION

An embodiment of a wheeled chassis according to the invention is shown in FIG. 1 as viewed from the outside in sideview, the shown wheeled chassis 1 is fitted with ground-engaging wheels 2R each being carried by a bearing block 2B which bearing block is pivotally mounted to the chassis as to be pivotal about a vertical steering axes, these mounting elements are not shown visible in FIG. 1, on the other hand, the wheeled chassis carries on top a supporting stem, shaft or journal T which in the drawing is shown pivotally holding a schematically illustrated seat S which comprises arm rests able to be swung outwards as well as downwards thus enabling a person to pass into and out from the seat S frontwards and sidewards. On the armrest at a suitable place a steering control panel STY is mounted comprising a "joystick" to be used for steering control when the wheeled chassis is driving. It comprises push buttons, etc., arranged as required for driving attached and/or other electric circuits which may serve other purposes than just for driving. Externally, the wheeled chassis 1 is surrounded by a suitable belt or girdle for receiving impacts while driving when passing close to foreign objects in the environment, and which belt or girdle, e.g., may be made of suitable soft rubber. The upper portion of the wheeled chassis 1 is covered by suitable detachable covers 1YL and 1YU.

FIG. 2 shows as viewed from above a horizontal cross section along the line II—II in FIG. 1 thereby showing elements arranged on a bottom plate member 3B which forms the bottom portion of the wheeled chassis. The bottom plate member 3B is provided with suitable apertures in which the ground-engaging wheels 2R, 2B are mounted. Centrally (FIG. 3 ), the bottom plate member 3B is provided with a suitably held and possible through in the vertical direction an operating spring suspension device TSIG comprising a plurality of electric contacts serving electrically to abut against corresponding electrical connectors mounted on the stem, shaft or journal T serving to pass control currents and steering signals between required electric drive situated in the wheeled chassis and the steering control panel STY positioned by way of example on the armrest. As an alternative, when instead touch-free electric transmission are employed, it is possible to provide a suitable selection of light-emitting-diodes and photo-transistors operating together with steering control electronic circuits and thus provide a touchfree signal transmission between the panel STY and the drive which are arranged in the wheeled chassis 1.

Such an electro-optical transmission may be provided to take place sidewards or in an axial direction to and from the lower end of the stem, shaft or journal T which to this purpose totally or only along a portion of the length of it is tube shaped.

To achieve a low position for the center of gravity of the wheeled chassis the rather heavy drive batteries BATT, of which six such are shown, are positioned on the bottom plate member 3B serving in the wheeled chassis to energize the various drive motors and being positioned together with a suitable (not shown) charging device LADE which when charging the batteries BATT is connected to a electrical supply outlet through a suitable removable electrical wire. In the drawing ELEK a space is shown which is to be occupied by the required electronic steering control units and circuit elements. The ground-engaging wheels are arranged mutually equally spaced along the periphery and are arranged equally spaced from the center of the wheeled chassis. The angle mutually formed geometrically in between the radii running from the center to the individual ground-engaging wheels is shown as 2V in FIG. 2 and will have a size which in practice closely corresponds to 72 degrees.

FIG. 1, of the drawing a wheeled chassis 1 is shown with cover plates 1YL as well as the external belt or girdle 1YBAN being shown removed. The bottom plate members illustrated in FIG. 2 have been removed, and places to possibly position the three drive devices MT, MR and MS are only schematically indicated. The stem, shaft or journal T, by way of example serving to carry a seat, it is only schematically indicated in FIG. 3.

In the embodiment of FIG. 3 there are provided five connecting main struts 1A connecting a bushing or bearing 5 for the stem, a shaft or journal T and a peripherally arranged angularly shaped member carrying bearing members for the steering axes 2S which through bearing blocks 2B, whereby one bearing block 2B is arranged at each wheel, to carry the individual ground-engaging wheels 2R. The ground-engaging wheels 2R can be shaped as any plate shaped, roller shaped or cylindrical shaped per se known wheel or the wheels may be shaped as semi-spherically shaped wheels.

The individual wheel suspensions may in per se known manner comprise a spring device. According to the invention a common spring device may be provided for all the ground-engaging wheels 2R. The spring device achieves that the individual steering axes of the ground-engaging wheels are mutually mainly only able to perform dislocating spring tensioned movements in a vertical direction. Movements, which result in the occurrence of mutually slanting orientations between the ground-engaging wheels thus can not occur. This is advantageous because any occurrence of such slanting providing or oblique positions providing movements of the steering axes of the ground-engaging wheels results in a wry-steering of the seat during the driving of the wheeled chassis. Such wry-steering is avoided by means of the invention when, as illustrated, preferably at least two mutually in parallel positioned plate and ring shaped elements 1PA and 1PB are peripherally arranged as angularly shaped members in the wheeled chassis. When five connecting struts 1A are provided, and if the number of ground-engaging wheels 2R, 2B corresponds to a multiple of five, in practice a fully only vertical upwards and downwards movability of the steering axes 2S of the ground-engaging wheels is achieved when spring tensioned movements of the axes take place due to an eccentric load influence being exerted on the seat which is mounted by means of the stem, shaft or journal T or due to the ground-engaging wheels 2R, 2B are driving on an uneven ground. On the other hand, a good result may in practice be attained, i.e. a sufficiently precise mainly vertical only upwards and downwards movability of the steering axes 2S of the ground-engaging wheels when spring-tensioned movements take place and, also when only three connecting struts 1A are mounted and by way of example five ground-engaging wheels 2R, 2B are provided. Such an embodiment is illustrated in the FIGS. 4 and 5 of the drawing whereby only three connecting struts are provided resulting in a more simple assembly when the wheeled chassis comprises three drive devices MT, MR and MS being able to be mounted on a plate shaped element 4 which in practice is comprised of three plate shaped elements, i.e. with such an element for each of the three drive units MT, MR and MS whereby each of these plate shaped elements comprises two horizontal, vertically spaced, plate members 4MA and 4MB. On the upper of these members one of the drive units MT, MR or MS is mounted with the corresponding drive shaft being vertically oriented and engaging a transmission gear, whereby this gear may be mounted along or possibly together with one or more discrete drive means or members in between two such horizontal plate members 4MA and 4MB. As it is shown in the FIGS. 4 and 5 of the drawing, the complete assembled structure may be simplified, but also as viewed from a manufactural point of view as advantageous be regarded as a peripherally hexagonal shaped structure.

Serving as outputs of the three transmission gears sprockets, MTT, MRT and MST are arranged, thereby possibly also including chain tight-holding members of per se known kind, engaging a chain for each referred to with MTK, MRK and MSK which are connected with sprockets respectively arranged at the lower end of the bushing or bearing means 5 for the stem, shaft or journal T for carrying the seat, respectively are arranged at the top of the individual steering axes 2S thus serving to provide rotation of the ground-engaging wheels 2R, and respectively are arranged below the top of the individual steering axes 2S thus serving to provide the orientation steering of the ground-engaging wheels 2R. An embodiment hereof according to the invention is described in further details as follows.

Figure 4:
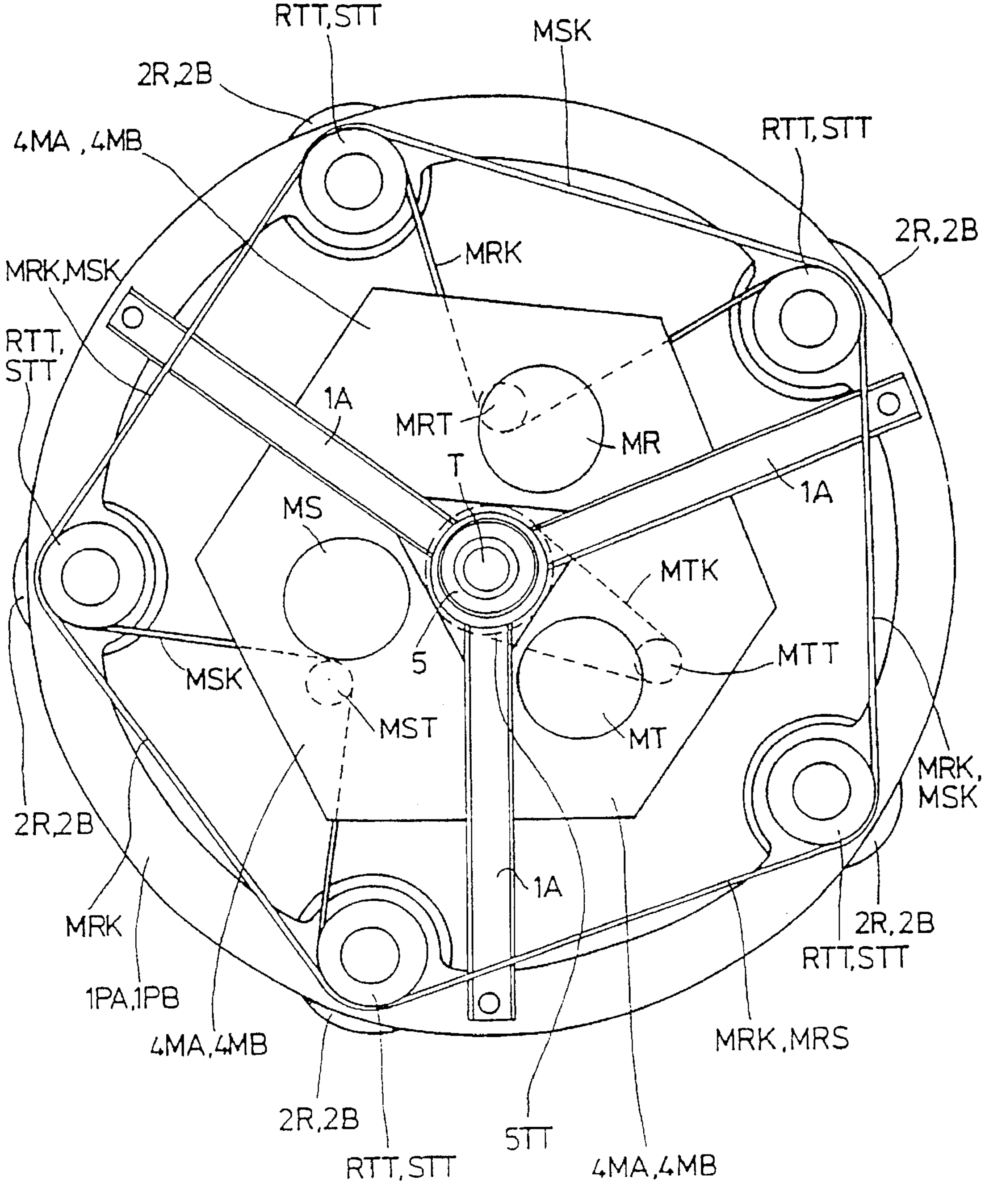
FIG. 4 shows from the top the embodiment according to FIG. 3 of a wheeled chassis according to the invention including the arrangement of drive devices and an embodiment for drive transmission.
Figure 5:
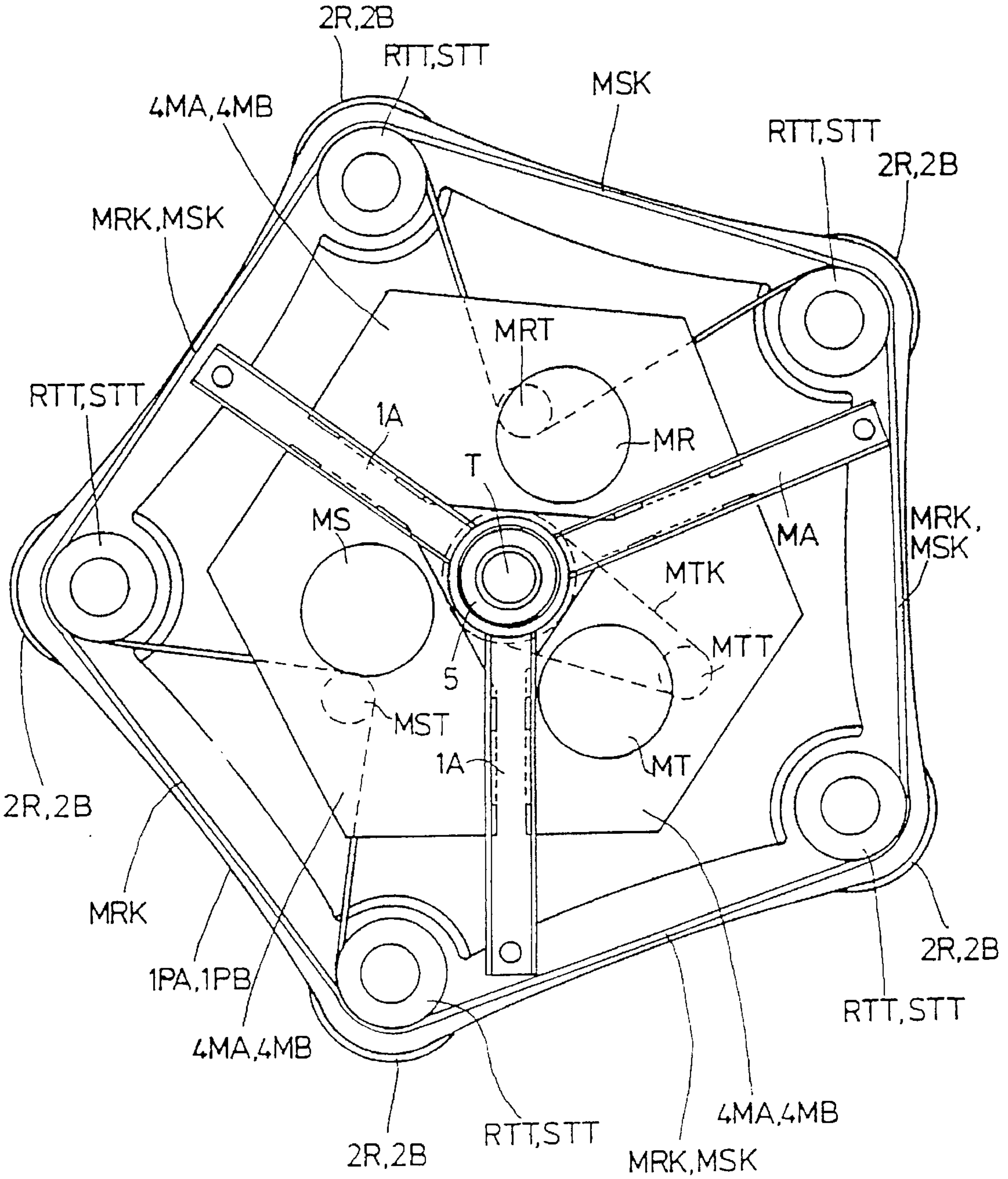
FIG. 5 shows another embodiment of the wheeled chassis which is shown in FIG. 4, FIG. 6 shown a vertical cross section through a ground-engaging wheel according to the invention including an embodiment of one of two coaxially arranged axes or shafts carrying the ground-engaging wheel including bearing and drive transmission for a steering axis or journal.

It is to be noted that thought in FIGS. 3 and 4 a circular shaped embodiment of the plate shaped peripherally arranged angularly shaped spring members 1PA and 1PB is illustrated, nothing prevents the use of other shapes. In FIG. 5 a pentagonal shaped embodiment with inwardly curved side portions thereof is shown. A strong inwards curve may in practice be employed. This shape may be advantageous in that more floor space is attained for a supporting persons feet. Alternatively in such a case, it becomes possible to drive closer to or while passing closer to objects in the environments, etc.

Figure 6:
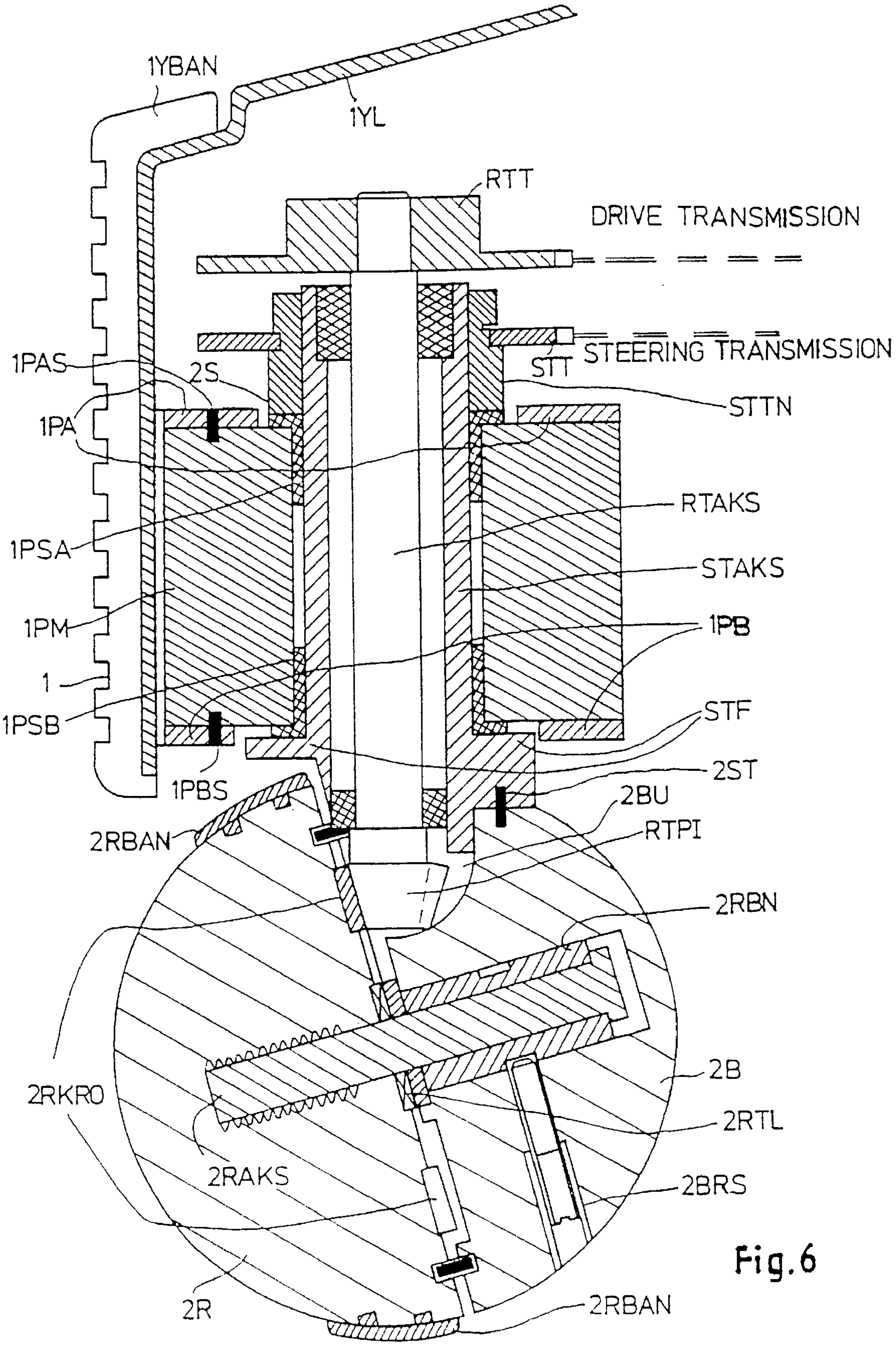

FIG. 6 shows a vertical cross section through a ground-engaging wheel arrangement 2R, 2B and the steering axis 2S including the bearing arrangement for the steering axis 2S as well through transmission sprockets RTT and STT arranged on the steering axis 2S. The ground-engaging wheels are arranged just inside the external corner 1 of the wheeled chassis 1. The cover 1Y carries an external belt or girdle 1Y and through the upper cover 1YL is stretched towards the stem, shaft or journal T.

Internally the cover 1Y is suitably elastical can be held in place at some positions, e.g. by means of springs, to the elastic and set of peripherally arranged angularly shaped plate members 1PA and 1PB. An open space is illustrated in FIG. 6 at 1Y between 1Y and the cross sectionally illustrated peripherally arranged angularly shaped plate members 1PA and 1PB; a suitable block shaped member 1PM is illustrated between these elements for the purpose of connecting them with the steering axes 2S, whereby the block shaped member 1PM is provided with a through-opening comprising a lining set consisting of bearing bushings 1PSA and 1PSB made of a suitable low friction providing material, such as nylon, etc., serving as a bearing for the steering axis 2S. The block shaped member 1PM is by means of suitable holding device, such as pins 1PSA and 1PBS, kept in plate on the peripherally arranged angularly shaped plate members 1PA and 1PB.

The steering axis 2S is prevented from performing movements upwards and downwards in the bearing by means of projections arranged at the sprocket STT and at a lower axis foot portion STF. The steering axis comprises two coaxially arranged axes or shafts, i.e. an external tube shaped axis or shaft STAKS serving to connect STT and STF and an internal driving axis or shaft RTAKS connecting the upper sprocket RTT and a lower bevel gear RTPI, whereby the axis RTAKS is held in place by bearing bushings positioned within the tube shaped axis or shaft STAKS. The bevel gear RTPI is engaging with another bevel gear or with a suitable circular gear 2RKRO being positioned on the plane surface of a semi-spherically shaped ground-engaging wheel 2R which can be made of a suitable rigid material by casting or turning the wheel here being possibly made from glass fiber reinforced plastic material and carrying a friction providing tread 2RBAN as well as a central journal 2RAKS of which the other end is button shaped, and whereby the thinner portion of the journal sits in a bearing bushing 2RBN which bushing is able to be stuck into a suitable bore of other aperture centrally in the wheel bearing block member 2B and is held in place in this block member by means of a screw 2BRS whereby this screw is made to project into a peripherally arranged notch on the bearing bushing 2RBN. A pressure or ball bearing 2RTL serves to keep the ground-engaging wheel spaced from the bearing block member 2B. A suitable angularly shaped sealing member, which only is indicated in the drawing, is arranged in the spacing between the wheel 2R and the block member 2B to provide a seal against dirt, frayed or fibrous material, etc. being caught in the space. At the top of the block shaped member 2B, a depression is arranged to provide ample space for the bevel gear wheel RTPI.

By means of drive chains referred to in the drawing by DRIVE TRANSMISSION and respectively by STEERING TRANSMISSION, the ground-engaging wheel 2R is brought to rotate in one or the other directions around the journal 2RAKS respectively that the orientation, i.e. the bearing, of the ground-engaging wheel 2R is steered by means of turning the tube shaped axis or shaft STAKS.

In FIG. 6 of the drawing it is indicated that the sprocket STT comprises a gear arranged around a carrying hub. This hub is advantageously held releasably in position, i.e. the hub of sprocket STT may consist of from above respectively and from below through tensional means against the gear tensioned angularly shaped members or a suitable set of set screws or any other known means may be arranged for providing a releasable fixation of the hub, so that, the mutual mechanical relation between the gear and the ground-engaging wheels thus is made adjustable, it is easy to insure that all ground-engaging wheels mutually are made to run in a parallel orientation and it is also easy through readjustment to reestablish this condition in case of possible replacement of chains including the case when a different length of chain may be used. It on the other hand is unavoidable that the steering will have to suffer due to some backlash which always is present when chains are used as transmission elements, etc.

Figure 7:
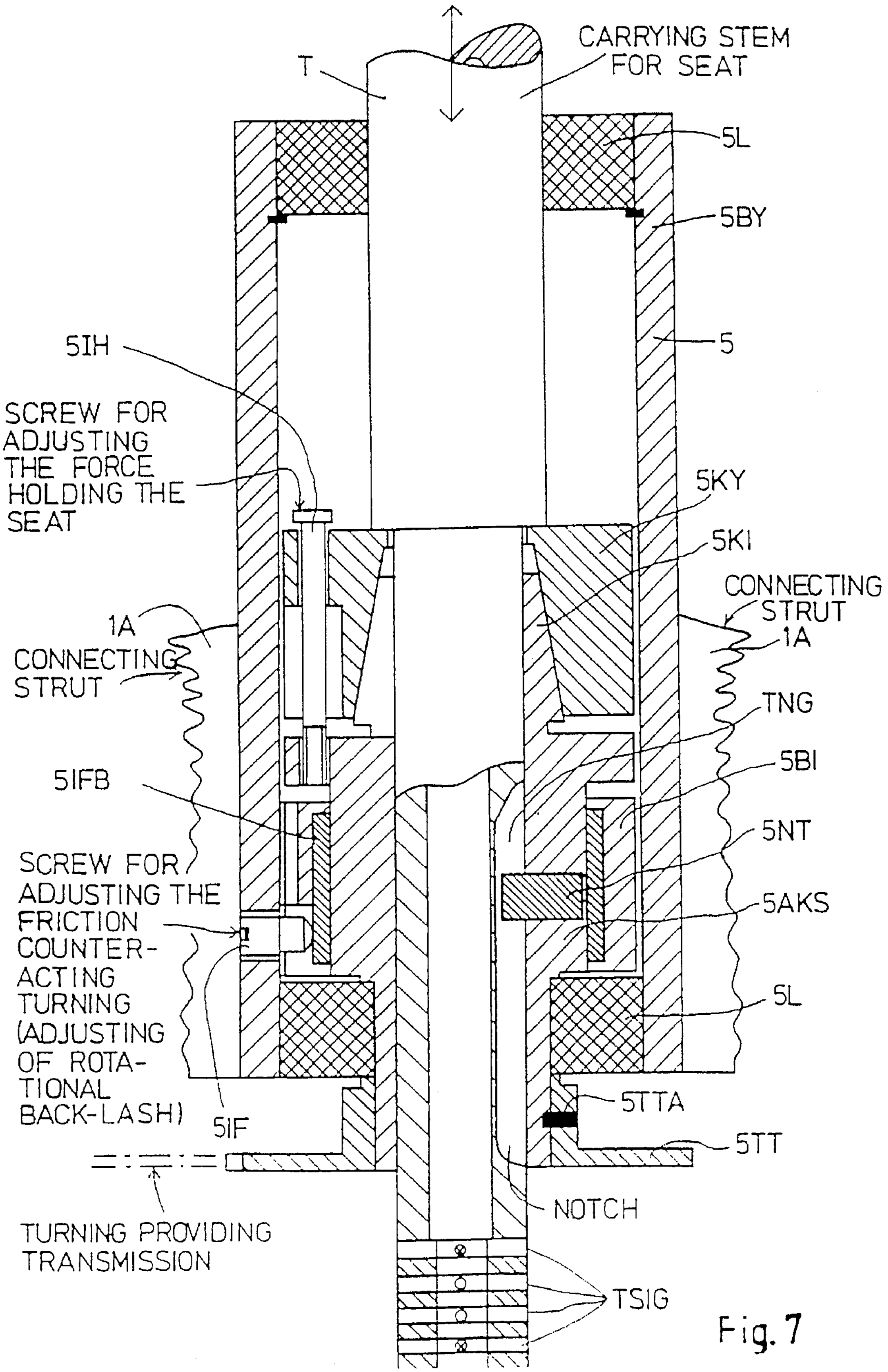
FIG. 7 shows vertical cross section through a carrying bushing bearing including a drive transmission as cut away showing a carrying stem, shaft or journal for the supporting of a wheelchair seat or for the supporting of any other object to be transported by the wheeled chassis.

In FIG. 7 an embodiment of a bearing bushing for the stem, shaft or journal T objective is illustrated. In this embodiment it is the achieve to attain that a usual expected force, which is being exerted against the seat in relation to the wheeled chassis, does not introduce any backlash movements between the stem, shaft or journal T and the wheeled chassis, just as abovementioned.

The stem, shaft or journal T is provided with a lower portion of it having a smaller diameter than the upper portion of it and being brought to abut against a bushing member 5KY provided internally with a conical shape which is resting abutting against an internal upward projecting conical portion 5KI whereby the conical portion is slotted as indicated (hatching is omitted) in the drawing of the left part of this conical portion. Furthermore, bearing bushings 5L serve to secure a proper bearing of the carrying stem, shaft or journal T. When the upper conical portion 5KY through tensioning of screw 5IH is pressed downwards, the internal conical portion 5KI is brought to squeeze the thinner portion of the carrying stem, shaft or journal T so to be moved up and down.

The thinner lower portion of the carrying stem, shaft or journal T is provided with a peripheral notch TNG into which a cross pin 5NT projects while being seated in a cross aperture in the portion of the conical member 5KI being situated below the tube shaped axis or shaft 5AKS.

When powered from the driving motor MD through the transmission the tube shaped axis or shaft is turned through the sprocket 5TT, which for instance by means of a cross pin 5TTA is fixedly secured thereto, the stem, shaft or journal T rotates one way or the other around whereby transmission of force is safely produced through the cross pin 5NT to the sidewalls of the notch TNG in the carrying stem, shaft or journal T. A friction bushing 5IFB, made of suitable friction providing material arranged around the axis or shaft 5AKS, is pressed against the axis or shaft 5AKS by means of an adjustment screw 5IF which is seated in a side aperture in a fixed external tube portion 5BY. The turning movements of the axis or shaft 5AKS and also the turning movements of the stem, shaft or journal T are counteracted, that is, the force delivered through the transmission and through the sprocket 5TT apart from the necessary moment to provide the turning of the stem, shaft or journal T also has to provide a moment to overcome the friction provided by the screw 5IF. In this manner an adjusting of the backlash of turning can be provided.

At the lower end of the carrying stem, shaft or journal T the presence of light emitting diodes and photo transistors is depicted which serve the purpose to provide transmission of signals as already described above to be handled by a corresponding signal handling device TSIG which is positioned on the bottom plate element 3B.

In practice for such a wheeled chassis batteries able to provide 40 amperehours of operation at a battery voltage of 24 volts and structurally incorporating an embodiment according to the invention as shown in the drawing may have a size so that the external belt or girdle 1BYAN arranged around the wheeled chassis has an external diameter of about 0.6 meter, and a diameter of the ground-engaging wheels of 0.1 meter, and the upper edge of the external belt or girdle 1YBAN is situated between 0.2 and 0.25 meter above the groundlevel. The complete height of the wheeled chassis, from the ground up with to the level of the bushing carrying the carrying stem, shaft or journal T, may in practice be the size of about 0.35 meter. A wheeled chassis which incorporates such dimensions will have a size well suited to be used for wheel chairs.

An advantageous electronic logic steering circuit providing a safe steering for such a wheeled chassis according to the invention is described in further detail as follows.

In the case of a wheeled chassis of this kind which is carrying a seat, a simple electronic steering in part with rotation itself of the ground-engaging wheels in relation to the chassis and in part with the pivotal or turning position of the seat in relation to the chassis can be provided for instance by means of a simple turn button device arranged for each of these conditions of operation of the wheeled chassis, e.g. by means of the steering panel arranged turnable potentiometers having a midposition providing zero-activity, for halting the drive motor which is connected to the turnable potentiometer, and when turned one or the other way around away from the midpositon provides rotational activity of the drive motor with progressively increased velocity of the motor, the more the potentiometer is turned away from the midposition, e.g. providing a proportional increasing of the velocity dependent on the size of the turning angle of the potentiometer. A spring may be provided so that the spring draws the potentiometer back to midposition, i.e. to halt condition, when the turn button is released.

A very large number of embodiments of this kind of steering are known together with different kinds of drive motors, including non-electric drive motors, and the above-mentioned type of steering is sufficiently well described to enable any person skilled in the art to construct and provide such steering devices.

Either the described gear arrangements or the drive motors themselves can be of such per se known kind that in case of being turned off, i.e. primarily when the mentioned midposition of the potentiometers is occupied, they function as brakes, i.e. that the influences from external forces exerted on the wheeled chassis or on the seat do not result in a mechanically continued or in a mechanically reversed running operation of the drive device. Such a braking force is provided either in itself is provided in the braking process or in that for its structure a suitable selection of per se known electric, mechanic on friction based transmission members to be arranged between the drive motor and the driven elements in the wheeled chassis has been done so that a limiting of drive force is achieved or in that a drive force deactivation or in part such drive force deactivation is selectable by the control thus providing that the wheeled chassis and/or the seal in case of hitting objects or in case of another person helping a person seated in the seat a pushing and/or a turning of the wheeled chassis and/or the seat away from a currently occupied position is made possible to be achieved either in that a sufficiently large influence of force is exerted from outside or in that directly through manipulation from outside break of control is provided.

Nevertheless, it may even be difficult in a simple manner for a handicapped person to operate these kinds of potentiometers in a simple manner, and also in the case, when in per se known manner through the insertion of added per se known microprocessor controls or through adding of per se known positional servo controls, such potentiometers completely or in part are substituted for one, two, three or more push buttons.

On the other hand, according to the invention an unitary structured electric/electronic steering control system serving to control all three of the mentioned drive motor operations is provided, permitting a person seated in the seat to be able to perform the operation single-handed, and even by means of one single finger, embodied in form of a so-called "joystick-control". Supplementarily a turntable potentiometer of the above-mentioned type is included serving to control the turning drivemotor of the seat making it possible to provide a control system by which to and from movements of joystick are carried out in the longitudinal direction of the armrest, which armrest here is assumed to be arranged oriented in parallel with the forward-orientation of the seat. It always will result in a driving of the ground-engaging wheels in the longitudinal direction irrespective of performed turning-operations of the seat in relation to the wheeled chassis. Movement of the joystick towards an object also results in a driving of the wheeled chassis in precisely that direction independent on the turning position of the seat.

A solution for providing this kind of control according to the invention is to house of the joystick held in position by a slave servo motor which counterturns the housing without thereby necessarily also a mutual turning being performed between the seat and the wheeled chassis, i.e. between the seat and the wheeled chassis according to the size of the turning angle based an angle encoder in per se known manner delivers a servo signal to this slave servo motor performing a corresponding counteracting turning of the joystick housing. The joystick, when being deflected in any selected direction, then only would have, determined by the annular deflection direction of the joystick in relation to the joystick housing, to output an activating signal to the drive-motor of the device which steers the ground-engaging wheels, and when the size of the deflection of the joystick away from the midposition thus has reached a predetermined minimum magnitude then the drivemotor for the providing of rotation of the ground-engaging wheels becomes activated. When the deflection of the joystick is further increased the velocity of the rotation is increased, e.g. linearly proportions, or possibly exponentially or according to any other suitable function, so that in a suitable manner the velocity is increased dependent on the size of the deflection of the joystick. Such kind of steering including electronic and mechanical devices to perform the steering is well known in a large number of variations of embodiments according to the technique of the prior art.

According to the invention it is, on the other hand, made possible to omit a servo control involving the annular position of the joystick housing in relation to the armrest, and furthermore, it is also advantageously and simply that the deflectional sizes of the angle encoder signals are reduced in a manner which is described in more details as follows.

All described angles are determined the same way in that a first angle encoder is arranged between the wheeled chassis and the ground-engaging wheels outputting a first encoder signal dependent on the angular size of a current bearing of a drive direction of the ground-engaging wheels in relation to the wheeled chassis, and second angle encoder outputs a second encoder signal dependent on an angular position of one of the seat or the holding means in relation to the wheeled chassis, a steering panel signal outputs a steering panel signal angularly dependent on a relative direction of a wanted directional bearing of driving in relation to the seat or the holding means, and outputs a control signal carrying information about a selected wanted drive velocity, and a device is provided for handling the outputted first and second encoder and steering panel signals comprising signal adders and signal substracters for providing from each individual angle encoder a difference signal in relation to an initial encoder signal issued as a reference representing a common initial direction of orientation of steering, the difference signal representing a difference between the first encoder signal and the second encoder signal, means are provided for providing double of a sum of the difference signal and including the steering panel signal, inclusive of a sine value forming device forming a sine value and a resulting signal is connectable, as steering signal to the steering drive motor serving for steering of an orientation of the ground-engaging wheels in relation to the chassis, and means are provided for multiplying a cosine value formed from the difference signal responsive to a drive situation selectable factor responsive to the steering panel signal and being connectable as a control signal to regulate activation and velocity of the drive motor for the driving of the ground-engaging wheels.

According to a further embodiment according to the invention at least one of these provided drive motor control signals is connected to the drive motor control circuit through a difference providing device which reduces these signals with a small contribution, of which results that larger steering panel output signals have to be provided before an activation of the respective drive motor can take place.

As compared to the first mentioned embodiment according to the invention a more simple control of chassis and seat is achieved involving fewer activations for performing turnings by means of the drive motors, as well as better adaptability of the drive and turning velocities to the steering operations performed by a person seated in the seat is experienced. For instance, to achieve sideways to and from driving along the edge of a table, no other corrections of the drive orientations, i.e. of the general bearing, than small ones due to unavoidable human inaccuracies by handling when operating the steering panel will have to be made, and thus large corrections of the drive orientation can be avoided, and this makes driving along the edge of a table with the wheel chair far more comfortably carried out than earlier. Also wear of floors and war of carpets is reduced by means of such a manner of steering because totally a lesser number of wheel movements are required.

An embodiment of the last mentioned kind is a further development of a steering arrangement for a wheel chair is described in further details and comprises a steering panel STY which e.g. is mounted on an armrest as illustrated in FIG. 9A. A further steering panel STYDRSD is illustrated being shown in FIG. 9A for simplification reasons. The two panels may be combined to form one single panel.

At the left armrest of the seat, a steering potentiometer SEATTURN of the above described first mentioned type is illustrated comprising a turnable button which from a forward directed midposition can be turned to one or the other side to produce a turning of the seat in relation to the wheeled chassis, ref. also FIG. 9A.

At the right armrest of the seat, a steering panel with a joystick is illustrated and shown in more details in FIG. 9B. The joystick is by small or large deflections deflectable in any direction away from a vertical midposition. During deflection, an output signal H is generated having an amplitude dependent on the size of the current deflection, e.g. linearly proportionally dependent, being for instance H=E*JOYSTICKDEFLECTION, and being for instance H–E or H=E*a suitable factor at full deflection. Dependent on the selected direction of deflection in relation to the armrest, here referred to through the angle, two sets of output terminals from the joystick yield partly a signal x∝E*cos ( ) and partly a signal Y–E*sin ( ), whereby E, as follows, can be regarded as either a common operating supply voltage of or as a reference voltage within the circuits.

As to be understood of FIG. 9 it is contemplated that, e.g. when manufacturing the wheel chair or at a later time when adjustments are being carried out, a direction "0" is provided as a common initial-orientation bearing for in part the driving of the wheeled chassis and in part for the direction of orientation of the seat. At a given moment, the ground-engaging wheels thus will be turned on angle ψ away from the common initial-direction "0". As follows a situation is described by which such an angle has the size ψ, from which current position a new drive orientation of the ground-engaging wheels which is wanted is established. The angle ψA is then the angle from which a turning to a new angle ψB is wanted to be provided, but the existing angle between the seat and the wheeled chassis is not to be changed. The seat direction in itself thus follows the wheeled chassis, but when the angle encoders were set to zero, both angles ψ and were equal to zero, thus the drive orientation cos "0" and the seat orientation "0" were mutually the same and thus both pointed in that direction.

As mounted between the seat and the wheeled chassis, angle encoders of a great variety of kinds may be employed, of which many are able to provide the same results as the angle encoders being contemplated while describing the invention and whereby the here made choice just has to be regarded as a more or less casual one.

In FIG. 9 of the drawings, the structural principle of an angle encoder of the double slide arm type is shown as comprising two such rotary slidable arms which are arranged 90° mutually spaced, and when the supplied voltages are +E and –E then dependent on the turning angle γ POT) and E* cos (γ POT), i.e. they thus function together as a sine-cosine-potentiometer being referred to in the following as SIN/COS/POT. These angle encoders are easily mounted in place so that the pointing direction of the arms towards the right zero-terminal corresponds to the described said common initial-direction of the seat and of the wheeled chassis in relation to the drive direction, i.e. the bearing direction, of the ground-engaging wheels.

When contemplating the condition illustrated in FIG. 9, an electronic circuit is described in further details and according to the invention it produces the aforementioned summation and difference operations whereby it should be remembered that the circuit provides an angular signal thus comprised $$\theta + -\psi A$$

Figure 10:
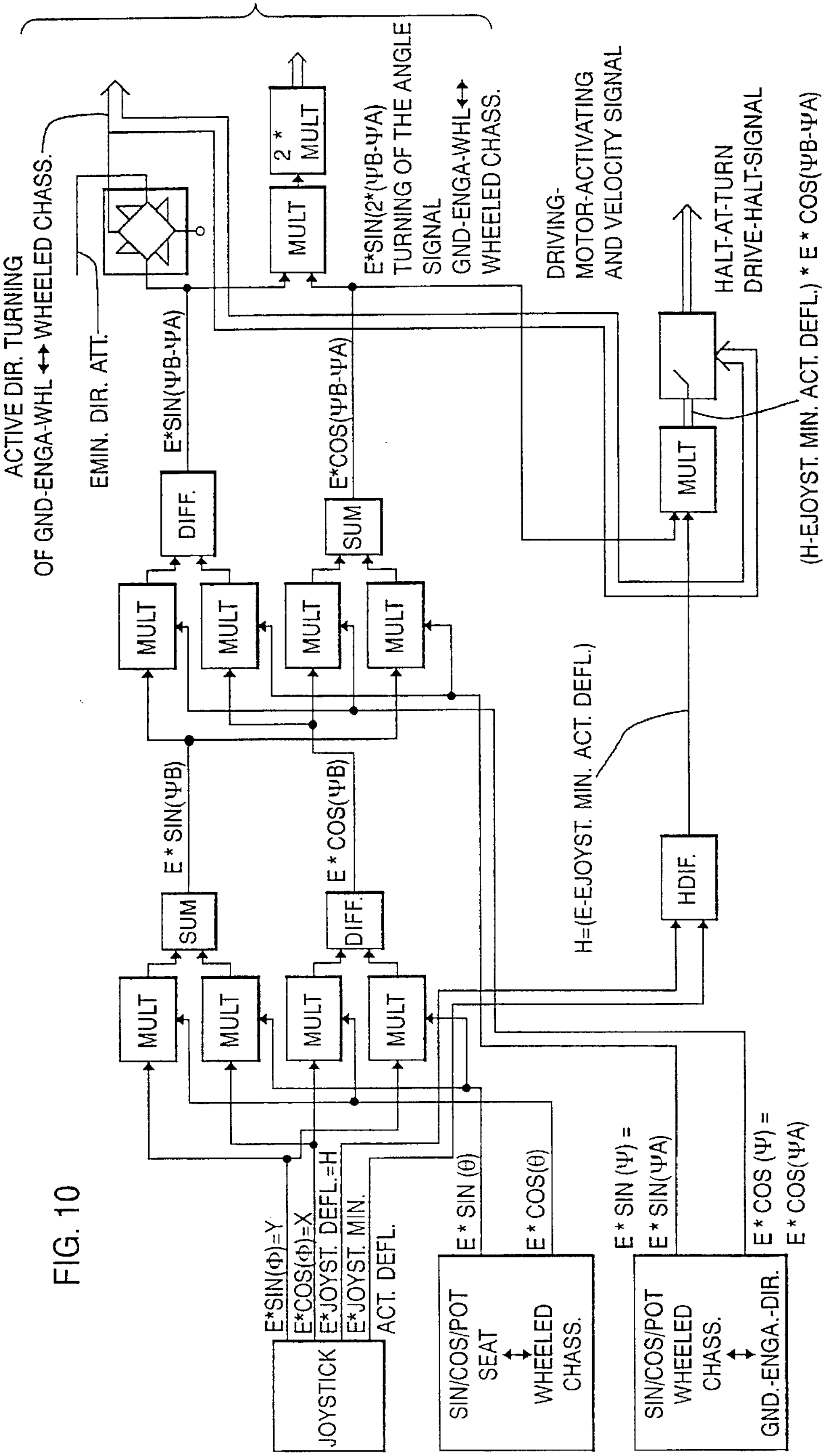
FIG. 10 shows the embodiment of a steering circuit and FIG. 11 shows the arrangement of angle encoders.

In FIG. 10 of the drawing such a circuit is illustrated. The left hand portion illustrates three signal providing elements: The joystick JOYST and the two sine/cosine/potentiometers SIN/COS/POT. The signals they provide are illustrated by means of the wire connections shown above them. It is furthermore contemplated, that JOYST yields a generally fixed signal which corresponds to the signal H from JOYST when the joystick is deflected just a small amount from the midposition, but which deflection on the first hand is too small to provide a sufficiently precise determination of the direction and on the other hand has to be regarded as being so small so that it accidently might have been incurred from outside and therefore should not result in any moving of the wheelchair. a difference providing device HDIF provides such a corrected velocity determining signal.

By means of eight multiplying devices which can be of the analog-signal-multiplying type and two summation providing devices and two difference providing devices two signals are yielded, which can described respectively as:

$$E^* \sin(\psi B - \psi A)$$

and $$e^* \cos(\psi B - \psi A)$$

in FIG. 10 of the drawing. The last mentioned hereof is, partly through a multiplying device to which also the arriving velocity signal HDIF is connected the size of which being determined by the size of the deflection of the joystick JOYST and partly through a switching device, connected to activate the drive motor which brings the ground-engaging wheels to rotate. By means of the value of the signal from the switching device the velocity and the running of the ground-engaging wheels are determined, whereby the sign of the voltage of this signal determines the direction of rotation of the wheels, i.e. either the one or the other way. On the other hand, the ground-engaging wheels should not rotate before the direction, i.e. the bearing direction, of these wheels has been sufficiently accurately adjusted. To this purpose the illustrated HALT-AT-TURN DRIVE-HALT-SIGNAL is used in that it controls the opening and closing of the switching device.

The two abovementioned signals are connected to one further multiplying device and through a multiplying device which only serves to multiply the signal by a factor of 2. The illustrated TURN ANGLE SIGNAL is hereby provided, and it is connected to the steering drive motor for the steering of the drive direction, i.e. of the bearing direction, of the ground-engaging wheels. This angle turn signal thus has a value:

$$E^* \sin g\,(2^*(\psi B - \psi A))$$.

The first of the two last mentioned as illustrated signals is used as illustrated at the upper right hand corner of FIG. 10 of the drawing as the aforementioned HALT-AT_TURN DRIVE-HALT-SIGNAL which first is passed through a device which removes possible changes of sign and furthermore subtracts a threshold value referred to as E MIN.DIR.ATT., so that a certain joystick deflection first has to be present before the drive direction, i.e. the bearing direction, of the ground-engaging wheels is altered. In this manner the carrying-out of unnecessary small-corrections of the drive direction are avoided.

To a great extent, the above-described circuit provides the advantages which are achievable by the invention.

Figure 11:
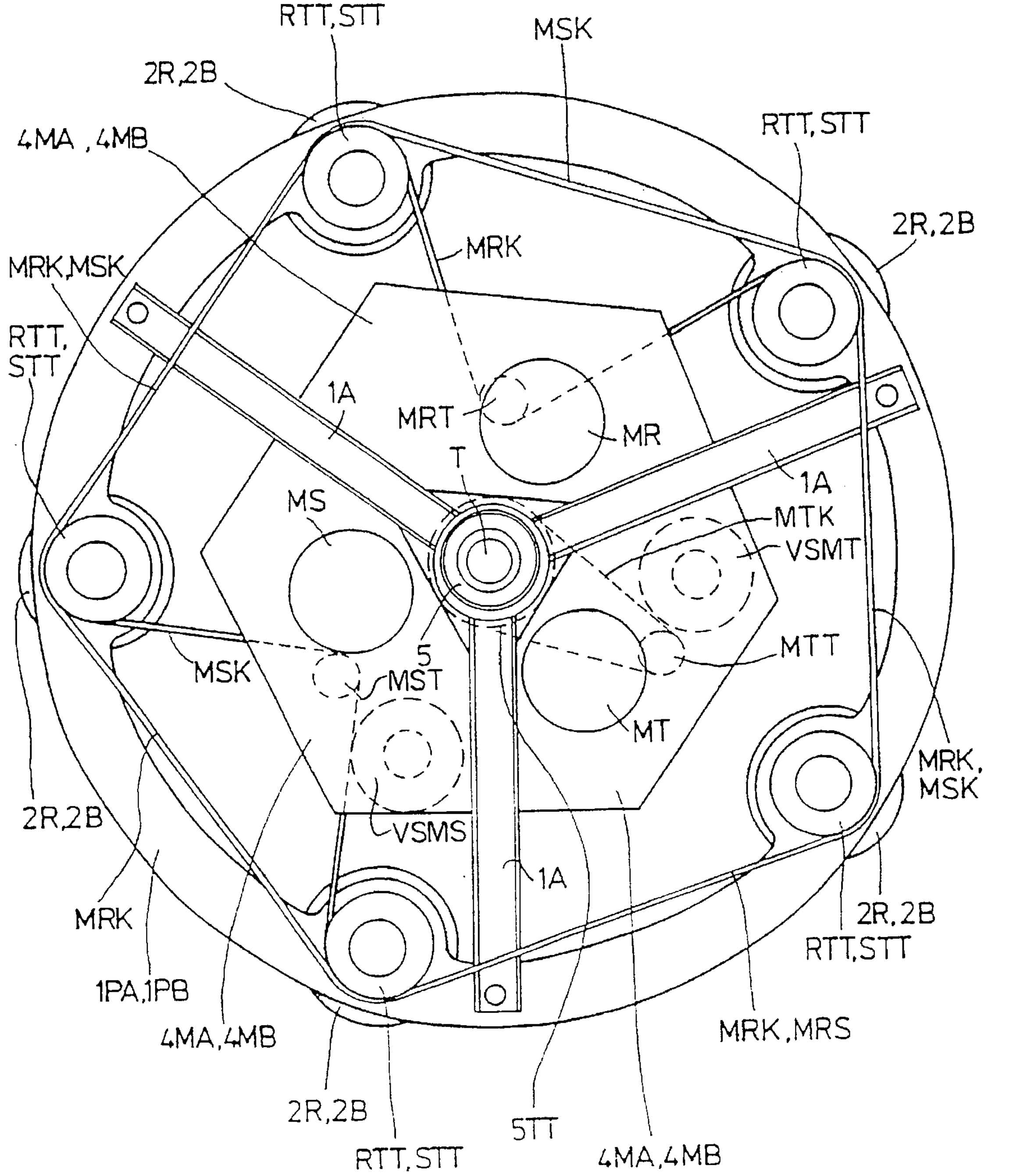

In FIG. 11 of the drawing a possible manner of placing the two angle encoders on the wheeled chassis is shown when the encoders by way of example are of the type which is illustrated in FIG. 8 with a direct on the slidable potentiometer arms arranged driving wheel, and when the wheeled chassis is shaped by way of example as illustrated in FIG. 4 of the drawing.

When the driving wheel arranged on the angle coders referred to in FIG. 11 as VSMS and VSMT are a sprocket, then the angle encoders S\VSMS and VSMT by way of example may be positioned so that each sprocket is engaging respectively the chains MSK and MTK. To achieve that the angle encoders provide correct output signals, the diameter of the sprockets may be shaped as to be equal to the diameter of the sprockets STT and STT which are positioned as driving sprockets partly on the mechanism which is steering the direction, i.e. the bearing direction, of the ground engaging wheels and partly on the turnable stem, shaft or journal carrying the seat. The angle encoders when mounted in position that they engage the chains MSK and MTK in such a manner that the angle signal "O" is attained the mechanism they control is adjusted to occupy the common initial-direction for the seat and for the ground-engaging wheels.

By means of the above-described steering device, a safe and precise functioning steering is achieved also with very fact acceleration and deceleration times for driving are attained. To achieve this it may be wanted that an adjustability of the acceleration and deceleration time is provided so that they can be kept within suitable limits. An advantageous embodiment according to the invention serving this purpose is that the steering device is connected to a device which, when changes of the steering values are introduced, delays these changes as a function of the time, and whereby the size of this time delay, which furthermore is dependent on the amplitude of the steering signal connected to the device respectively of the control signals which are applied to the device.

Such a device which is connected with the steering device can for instance be included in the output from the difference providing device HDIF illustrated in FIG. 10. It is achieved that the wheeled chassis are not accelerating too fast when they have been moved, and if the time delay furthermore is made dependent on the amplitude it is easily achieved that the acceleration may be made small at small velocities and be made large or somewhat larger when the velocity is a little larger than just a very low velocity and is limited to not being too large at comparatively high velocities and somewhat the same being the case, but possibly through choice of other sizes of time delays, at decelerations although depending on the manner of employing the wheeled chassis. The time delays may possibly be made stepwise changeable by means of switching members which then may be arranged for the purpose.

We claim:

1. A wheeled chassis including a drive motor for driving a plurality of ground-engaging wheels, the wheeled chassis having at least one of the wheels driven by the drive motor through a drive transmission, and having at least one of the wheels for steering of a driving course of the chassis mounted on the chassis through a steerable support which is steerable by means of at least one steering motor connected to the steerable support which receives steering signals from a steering panel having steering control devices, and all steerable wheels are driven by the drive motor, the driven ground-engaging wheels are pivoted about a vertical steering axis geometrically maintained relative to a vertical plane comprising an axis of the at least one steerable wheel, and a steering transmission system providing the pivoting of steering axes simultaneously and in a same direction of rotation of this pivoting, each steering axis pivoting an individual wheel of all the driven ground-engaging wheels about the individual steering axes through substantially equal pivoting angles with the driven ground-engaging wheels connected directly, or through a drive transmission system, to the drive motor for being rotated all simultaneously, through equal units of time in only one direction of rotation through substantially equal angles of rotation about the drive axes of the ground-engaging wheels, the wheeled chassis further comprising support means to support a seat or holding means for fixation and holding of objects to be transported, a first angle encoder arranged between the wheeled chassis and the ground-engaging wheels outputting a first encoder signal dependent on the angular size of a current bearing of a drive direction of the ground-engaging wheels in relation to the wheeled chassis, and a second angle encoder outputting a second encoder signal dependent on an angular position of one of the seat or the holding means in relation to the wheeled chassis, a steering panel signal outputting a steering panel signal angularly dependent on a relative direction of a wanted directional bearing of driving in relation to the seat or the holding means, and outputting a control signal carrying information about a selected wanted drive velocity, and a device for handling the outputted first and second encoder and steering panel signals comprising signal adders and signal subtracters for providing from each individual angle encoder a difference signal in relation to an initial encoder signal issued as a reference representing a common initial direction of orientation of steering, the difference signal representing a difference between the first encoder signal and the second encoder signal, means for providing double of a sum of the difference signal and including the steering panel signal, inclusive of a sine value forming device forming a sine value and a resulting signal is connectable, as steering signal for the steering drive motor serving, for steering of an orientation of the ground-engaging wheels in relation to the chassis, and means for multiplying a cosine value formed from the difference signal responsive to a drive situation selectable factor responsive to the steering panel signal and being connectable as a control signal to regulate activation and velocity of the drive motor for the driving of the ground-engaging wheels.

2. A wheeled chassis according to claim 1 wherein at least one of the motor control signals is connected to a drive motor control circuit through a difference providing device for reducing with a smaller level at least one motor control signal to acquire a higher level of a final control signal which serves to enable a motor drive function.

3. A wheeled chassis according to claims 1 or 2 further comprising a device for delaying the at least one motor control signal with a magnitude of time delay furthermore dependent on a magnitude of a signal connected to the device and being magnitude dependent on the steering panel signal which is connected to the device.

4. A steering system according to claims 1 or 2 wherein the steering axis comprises two coaxial axes with a coaxially innermost shaft at a lower end terminating in a gear, engaging a conical gear of one of the ground-engaging wheels whereby one of the wheel axes geometrically together with the ground form an angle, between 10 and 30 degrees, and whereby the one wheel axis is suspended in a bearing block in a fixed manner connected with a coaxially outermost of the steering axes, and whereby an upper end of two coaxial steering axes respectively are connected with a drive transmission system and with a steering transmission which respectively provide drive connections with the drive motor and the at least one steering motor.

5. A wheeled chassis according to claim 4 wherein each ground-engaging wheel and the bearing block are semi-spherically shaped and are arranged with flat surfaces facing each other.

6. A wheeled chassis according to claim 5 wherein an annular sealing means is provided between said semi-spherically shaped engaging wheel and bearing block.

* * * * *